Aug. 14, 1962 G. A. NEYHOUSE ETAL 3,049,021
POWER DRIVE APPARATUS
Filed April 6, 1959 2 Sheets-Sheet 1

INVENTORS.
Ralph K. Shewmon
Jack W. Savage
BY George A. Neyhouse

C. R. Meland
Their Attorney

INVENTORS.
Ralph K. Shewmon
Jack W. Savage
George A. Neyhouse
BY
C. R. Meland
Their Attorney United States Patent Office 3,049,021
Patented Aug. 14, 1962

3,049,021
POWER DRIVE APPARATUS
George A. Neyhouse and Jack W. Savage, Dayton, and Ralph K. Shewmon, Centerville, Ohio, assignors to General Motors Corporation, Detroit, Mich., a corporation of Delaware
Filed Apr. 6, 1959, Ser. No. 804,345
11 Claims. (Cl. 74—472)

This invention relates to power drive apparatus that includes an electric motor and more particularly to power drive apparatus for washing machines.

In present-day washing machines it has become desirable to provide a plurality of tub speeds in order to accomplish effective clothes washing. This requirement of a plurality of speeds has severely taxed the drive system for the tub due to the constantly changing torque requirement and has often required the use of an excessively large motor in order to meet peak torque requirements.

It is accordingly an object of this invention to provide a power drive apparatus for the tub of a washing machine or the like wherein the torque output of the motor is patterned to the torque requirements of the machine thus greatly reducing hammering and overstressing of the drive mechanism.

Another object of this invention is to provide a power drive apparatus for a washing machine or the like that is capable of providing three tub speeds with the use of a single speed motor and a variable output speed transmission having two output speeds. This object is accomplished by operating the motor at its running and accelerating characteristics in both the high and low speed settings of the transmission and by causing the motor to deliver less than full torque output with the transmission shifted to tis high speed setting to provide a third tub speed.

Still another object of this invention is to provide a power drive apparatus for a washing machine or the like that is capable of providing three tub speeds with the use of a single speed motor and a variable output speed transmission having two output speeds by causing the motor to operate at its running and accelerating characteristic when the transmission is set for either low speed output or high speed output, and further by causing the motor to deliver alternately full torque output and a lower torque output in response to the tub attaining a predetermined rotational speed with the transmission in its high speed setting and thus causing the tub to be driven at a third speed.

A further object of this invention is to provide a power drive apparatus for the tub of a washing machine that includes an electric motor and a two-speed transmission and wherein means are provided for preventing shifting of the transmission to its high speed position when the motor is at rest. This means that the motor will never have to start the machine while the transmission is in its high speed shifted position even when the timer that controls the system is set for high speed operation.

Still another object of this invention is to provide a power drive apparatus for the rotatable tub of a washing machine that includes an electric motor and wherein the electric motor is controlled to start with full torque output but wherein the motor is controlled to deliver a reduced torque output after a predetermined time delay following the starting of the motor.

Further objects and advantages of the present invention will be apparent from the following description, reference being had to the accompanying drawings wherein preferred embodiments of the invention are clearly shown.

Figure 1:
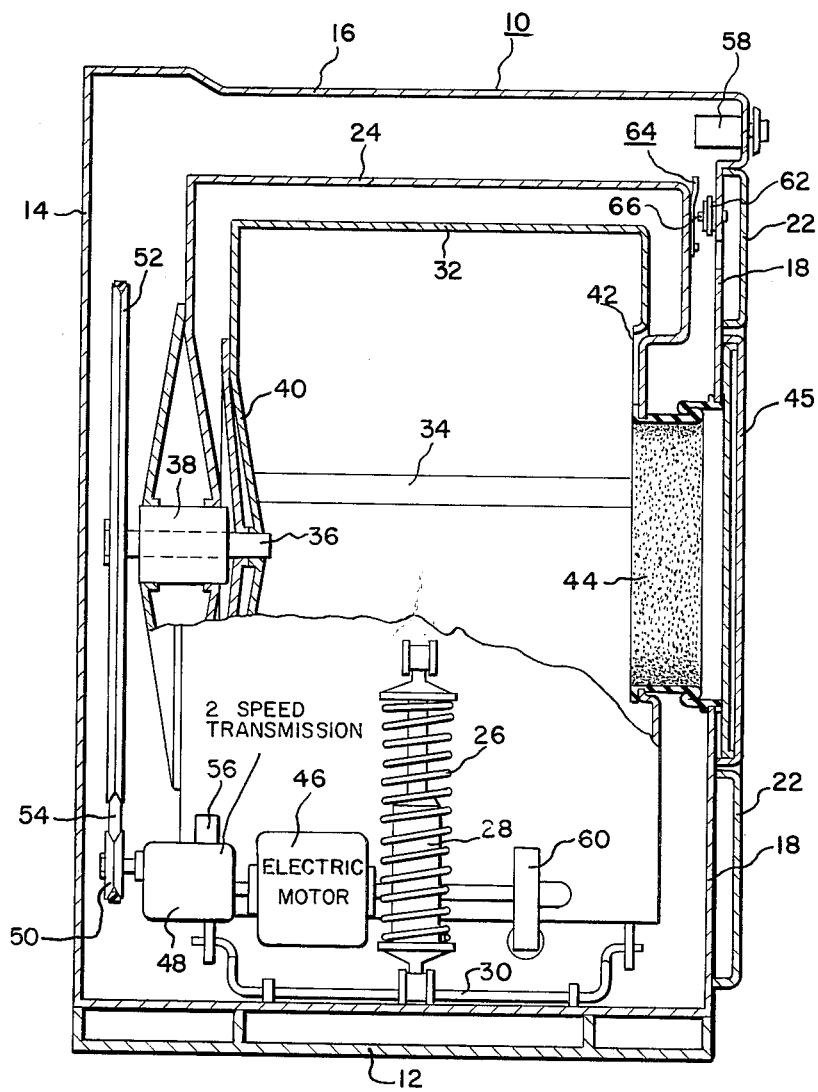
FIGURE 1 is a side view with parts broken away of a washing machine that is adapted to be driven by the power drive apparatus of this invention.

Referring now to the drawings and more particularly to FIGURE 1 it is seen that the washing machine that is to be driven by the power drive apparatus of this invention is generally designated by reference numeral 10. The washing machine includes a main base 12 and a cabinet having a rear wall 14, a top wall 16 and a front wall designated by reference numeral 18. A decorative trim panel designated by reference numeral 22 is provided which pivotally supports a door designated by reference numeral 45.

The cabinet of the washing machine contains an imperforate tub designated by reference numeral 24 which is suspended from the main base 12 by springs 26 and fluid pressure shock absorbers 28. The springs 26 and shock absorbers 28 are pivotally connected at opposite ends with the tub 24 and with the main base 12. It will be appreciated that only one of the springs and shock absorbers is illustrated in FIGURE 1 but that another one will be provided on the opposite side of the tub 24 which is not shown. The tub 24 is further suspended by a torsion bar designated by reference numeral 30 which is pivoted to the main frame 12 and to the tub 24. The torsion bar 30 restrict the tub from front to back movement while the springs 26 and shock absorbers 28 take up the side-to-side motion of the tub.

Positioned within the tub 24 is a rotatable tumbling drum or tub designated by reference numeral 32 and having an outer cylindrical perforated wall. The tub 32 is provided with the usual tumbling vanes 34 and has a rear wall designated by reference numeral 40. The tub 32 has a front opening designated by reference numeral 42 which permits the insertion of clothes within the tub. A flexible diaphragm or boot 44 having a cylindrical shape is connected between tub 24 and the front wall 18 of the machine. This boot may be formed of rubber and the like and prevents entry of water into the area between the tub 24 and the cabinet of the machine. The door 45 engages an outer circumferential edge of the boot 44 when in a closed position.

The tub 32 is driven by a shaft designated by reference numeral 36 which is journaled in a bearing 38 that is in turn supported by the tub 24. The shaft 36 is connected with a pulley 52 which is driven from a pulley 50 and a V-belt 54.

An electric motor designated by reference numeral 46 is provided which has an output shaft connected with a two-speed transmission designated by reference numeral 48. It is seen that the output shaft of the two-speed transmission 48 is connected with the pulley 50. The two-speed transmission 48 may take any conventional form but it is preferred that it have a low speed output and a higher speed output that becomes effective whenever a relay coil or solenoid 56 is energized. Thus, during time that relay coil or solenoid 56 is deenergized, the two-speed transmission 48 has a low speed output, but when the solenoid 56 is energized, the transmission is shifted to provide a higher speed output. By way of example and not by way of limitation, the drive mechanism between the motor 46 and the tub 32 may be such that when the transmission is operating at its low speed output, the transmission ratio between the motor and tub is 40 to 1, or in other words, the tub is driven one revolution for every 40 revolutions of the motor shaft.

When the solenoid 56 is energized to shift the transmission, the drive ratio between the motor 46 and tub 32 is shifted to a 4.0 to 1 ratio or in other words, the tub is driven one revolution for every 4.0 revolutions of the shaft of motor 46. The motor 46 may also be coupled to a pump designated by reference numeral 60 which is adapted to exhaust washing fluid from the tub 24. The motor 46 and transmission 48 are mounted on the tub 24 so that they move therewith.

Although a particular type of washing machine having certain features is illustrated in FIGURE 1, it will be readily apparent to those skilled in the art that the control circuit to be described hereinafter might be used with washing machines having other constructional features.

In FIGURE 1 the reference numeral 58 has been used to designate a timer for controlling the cycle or program of operation of the washing machine. This timer includes the usual cam operated switches driven by an electric motor. The function of these switches in relation to the motor and solenoid operated transmission is described in more detail hereinafter.

The washing machine illustrated in FIGURE 1 is provided with an electrical switch means that is actuated upon a predetermined excessive out of balance movement of the tub 24. To this end, a switch actuator generally designated by reference numeral 64 is attached directly to the tub 24 and moves therewith. This switch actuator cooperates with an electric switch designated by reference numeral 62 and having a switch actuating button 66. If the tub 24 should move with excessive out of balance movement in a back and forth direction, the switch button 66 is engaged by the switch actuator 64 to shift the contacts of switch 62. The switch actuator 64 preferably has a cam face, not shown, which also engages the switch button 66 when the tub 24 moves excessively in a side-to-side out of balance motion. It will be appreciated therefore that the switch 62 will be tripped whenever the tub 24 moves in a predetermined excessive out of balance movement.

Figure 2:
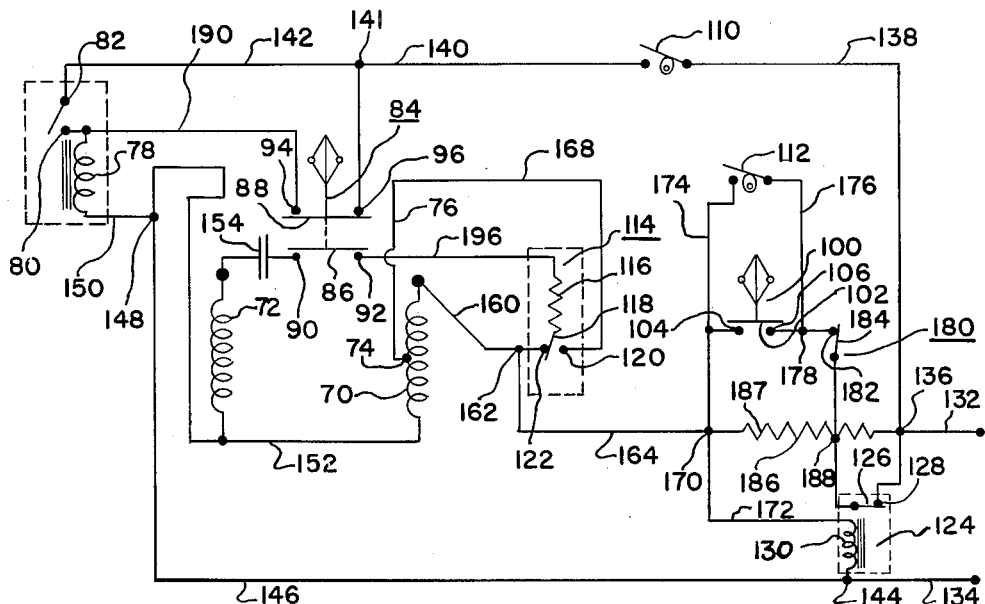
FIGURE 2 is a schematic circuit diagram illustrating a control circuit for controlling the electric motor and two speed transmission that forms a part of the drive apparatus of this invention.

Referring now particularly to FIGURE 2, it is seen that the induction motor for driving the tub 32 has a main winding designated by reference numeral 70 and a start or phase winding designated by reference numeral 72. Both the main and start windings are preferably four-pole windings so that the motor will have a running speed, for example, of 1725 r.p.m. The main winding 70 is tapped at 74 and this tap point is connected with a lead designated by reference numeral 76.

The solenoid coil which is equivalent to the coil designated by reference numeral 56 in FIGURE 1 is designated by reference numeral 78 in FIGURE 2. The coil 78 in addition to shifting the transmission from its low to its high speed output setting is arranged to cause a movable contactor 82 to become engaged with a fixed contact 80 whenever the coil 78 is energized.

A centrifugal switch generally designated by reference numeral 84 is provided which operates in response to motor speed. The centrifugal switch includes a first movable contactor designated by reference numeral 86 and a second movable contactor designated by reference numeral 88. The movable contactors 86 and 88 are mechanically coupled together but are not electrically connected together. The contactor 86 cooperates with a pair of fixed contacts designated by reference numerals 90 and 92, whereas the contactor 88 cooperates with a pair of fixed contacts 94 and 96. The centrifugal switch is arranged so that the contactor 86 leaves contacts 90 and 92 and the contactor 88 engages contacts 94 and 96 when the motor speed reaches approximately 1500 r.p.m. The switch is further designed so that contactor 86 moves back into engagement with contacts 90 and 92 and contactor 88 leaves contacts 94 and 96 when the motor speed drops below 1200 r.p.m.

A second centrifugal switch is provided which is generally designated by reference numeral 100, and which operates at motor speed. This centrifugal switch includes a movable contactor 102 that cooperates with fixed contacts 104 and 106. The auxiliary centrifugal switch 100 is adapted to connect contacts 104 and 106 whenever the motor speed is below 750 r.p.m. When the transmission is shifted to its high output speed setting, this corresponds to a tub speed of 188 r.p.m. At all speeds above 750 r.p.m., the centrifugal contactor 102 is out of engagement with contacts 104 and 106 and at all speeds below 750 r.p.m. motor speed, the contactor 102 connects fixed contacts 104 and 106.

The timer operated switch contacts are designated by reference numerals 110 and 112 in FIGURE 2. It will be appreciated that these timer operated contacts are controlled by a timer mechanism that is equivalent to the timer illustrated and designated by reference numeral 58 in FIGURE 1. In other words, the timer operated switches 110 and 112 are caused to be opened and closed in a predetermined sequence to control the operation of the electric motor and two speed transmission.

A time delay relay generally designated by reference numeral 114 is provided that includes a heater element 116 and a contact 118 that cooperates with fixed contacts 120 and 122. This time delay switch is arranged so that movable contactor 118 normally engages fixed contact 122 but when an electrical current is passed through the heater element 116, the movable contactor 118 is shifted into engagement with fixed contact 120 after a predetermined time delay. This type of switch is well-known to those skilled in the art and may take any conventional form wherein a contactor is shifted out of engagement with one fixed contact and into engagement with another fixed contact after a current is passed through the heating element for a predetermined length of time.

A relay generally designated by reference numeral 124 has a movable contactor 126 that cooperates with a fixed contact 128. The relay includes an actuating coil designated by reference numeral 130. When a predetermined voltage is impressed across the actuating coil 130, the movable contactor 126 is shifted out of engagement with fixed contact 128. When the voltage applied across relay coil 130 is below some predetermined value, the movable contactor 126 is maintained in engagement with the fixed contact 128.

The power input lines for the motor and two-speed transmission are designated by reference numerals 132 and 134 in FIGURE 2. These lines 132 and 134 are adapted to be connected with a suitable source of voltage through line switches or other timer operated switches not shown. The line 132 is connected with a junction 136 and it is seen that this junction is connected with a lead wire 138. The lead wire 138 is connected to one side of timer operated switch 110 and the opposite side of the timer operated switch is connected with a lead wire 140, junction 141, lead wire 142 and to one side of the contactor 82. The lead wire 134 is connected with a junction 144 and is connected with a lead wire 146 which is connected with junction 148 and with one side of spin shift solenoid 78 via a lead 150. The junction 148 is connected with a lead wire 152 which forms a common connection for one side of the start winding 72 and the main winding 70 of the motor. The opposite side of the start or phase winding 72 is connected with centrifugal switch contact 90 via a capacitor 154. The opposite side of main winding 70 is connected with a lead wire 160 which is in turn connected with junction 162. The junction 162 is connected with time delay switch contact 122 and is connected with a lead wire 164. One side of the heater element 116 of the time delay switch 114 is connected with centrifugal switch contact 92 via a lead 196. The tap point 74 on the main winding 70 of the motor is connected with contact 120 of the time delay switch via a lead designated by reference numeral 168.

The lead wire 164 is connected with a junction 170 and it is seen that this junction is connected to one side of relay coil 130 via a lead 172. It is seen that junction 170 is also connected with lead wire 174 which connects to one side of timer operated switch 112 and is also connected with centrifugal switch contact 104. The opposite side of timer operated switch 112 is connected with a lead 176 and this lead is connected with a junction 178. It is seen that junction 178 is connected with fixed contact 106 and is connected to one side of a switch designated by reference numeral 180. The switch 180 has a fixed contact and a movable contact 184. This switch 180 is equivalent to the switch designated by reference numeral 62 and it is therefore understood that movable contactor 184 will be shifted out of engagement with its fixed contact whenever the tub 24 moves with excessive out of balance movement.

A ballast impedance such as a resistor designated by reference numeral 186 is provided which is connected between junctions 136 and 170. This resistor is tapped as at 188 and this tap point is connected with switch 180 and with relay operated contactor 126.

When it is desired to effect a low-speed tumbling operation of the tub 32, the timer operated switch contactor 110 is caused to remain open while the timer operated switch contactor 112 is caused to be closed. The motor will now accelerate with full torque output since both the main and phase circuits are energized with full line voltage. The phase winding is energized from a circuit that may be traced from lead 132, junction 136 tap point 188, through switch 180, through timer operated switch 112, through lead wire 164, through junction 162, through movable contactor 118, through heater 116, through lead wire 196, through centrifugal switch contactor 86 and thence through the starting capacitor 154 to the start of phase winding 72. It is seen that at this time the main winding is energized from lead 160. The motor will now accelerate with its full torque output since the phase circuit is connected directly across the main winding 70. If the voltage across the coil 130 should exceed some predetermined value, the contactor 126 is moved out of engagement with fixed contact 128 to cause a portion of the ballast resistor to the right of junction 188 to be inserted in the circuit and thus reduce the voltage applied to the motor windings. It will be appreciated that if the voltage across the lines 146 and 164 is below some predetermined value, the contactor 126 engages fixed contact 128 to short circuit the portion of the resistor to the right of junction 188 out of the circuit and increase the voltage applied to the motor windings. The relay 124 thus operates as an input voltage regulator by changing the voltage applied to the motor in accordance with the voltage applied across the relay coil 130. This regulator operates through all of the speed cycles of the motor to be more fully described hereinafter.

As noted above, when the timer operated switch 110 is opened and timer operated switch 112 is closed, the motor accelerates under its full torque value because the phase winding 72 is now connected across the main. It can be seen that immediately upon energization of the main winding 70 and the start winding 72, the heater element 116 of the relay 114 has current passing therethrough and after some predetermined time delay, the contactor 118 shifts over into engagement with fixed contact 120. When this occurs, the phase winding 72 is now fed via a circuit that may be traced from tap point 74 of main winding 70, through lead wire 76, through fixed contact 120 and movable contact 118, through lead wire 196 and thence through the centrifugal switch contactor 86 to the start winding 72. The torque output of the motor will now be reduced and if the tap point 74 is midway the length of main winding 70, the voltage applied to the start circuit is one-half of that which is applied to the start circuit when it is connected directly across the main. The motor will now accelerate with a reduced torque output and when the centrifugal switch contactor 86 shifts away from contacts 90 and 92, the start winding is disconnected from the circuit. The motor then operates on the main winding alone, and the tub will be driven at approximately 43 r.p.m. due to the fact that the spin shift solenoid 78 is not energized and thus the speed ratio between the motor and tub is 40 to 1.

When it is desired to effect an intermediate spin or low-speed spin cycle for the tub 32 that immediately follows the low-speed tumbling of the tub 32, the timer operated switch contactor 110 is caused to be closed while the timer operated switch contactor 112 is caused to be opened. It will be appreciated that this switching of the timer operated switch contacts occurs very rapidly and the centrifugal switch contactor 88 will therefore still be connecting contacts 94 and 96 after the shifting of the timer operated switches has occurred. With contactor 88 still engaging contacts 94 and 96, a circuit is completed for the spin shift solenoid 78 that may be traced from lead 132, through lead 138, through timer operated switch 110, through centrifugal switch contactor 88, and through lead wire 190. With solenoid coil 78 energized, the transmission immediately shifts from its low-speed output to its high-speed output so that a transmission ratio now exists between the motor and tub at 4.0 to 1. In addition, the holding contact 82 is shifted into engagement with fixed contact 80. With the shifting of the transmission, the motor slows down to the point where contactor 86 engages the fixed contacts 90 and 92. With contacts 90 and 92 connected together, both the main winding 70 and the start circuit are once more energized to begin acceleration of the tub. The start winding is energized with full line voltage because at this time the contactor 118 is in engagement with fixed contact 122. After a predetermined time delay, however, the contactor 118 again shifts over into engagement with fixed contact 120 so that the start winding after a predetermined time delay is connected lower than full line voltage and the motor now has a lower torque output. When contacts 104 and 106 are connected together, the motor continues to accelerate under its reduced torque output due to the connection of the phase winding with tap point 74 on the main winding until the centrifugal switch 102 shifts out of engagement with contacts 104 and 106. When this occurs, the motor windings must be fed through the portion of resistor 186 to the left of junction 188 designated by reference numeral 187. It will be appreciated that the torque output of the motor is now reduced further due to the fact that the motor is now fed through resistor 187 rather than through the short circuit path that includes movable switch contactor 102. This torque output is designed to maintain the tub speed at approximately 188 r.p.m. and should the motor speed once more go below 750 r.p.m., the movable contactor 102 will move back into engagement with fixed contacts 104 and 106 to increase the voltage applied to the motor and the torque output of the motor. It thus is seen that the contactor 102 will change the torque output of the motor in accordance with motor speed to maintain a motor speed of 750 r.p.m. or approximately 188 r.p.m. tub speed. It will be appreciated from the foregoing that the motor during the intermediate or low-spin cycle is initially accelerated by full motor torque and this torque is reduced in value first by a shifting of relay contactor 118 and then is further reduced by the opening of centrifugal switch contactor 102 when the motor speed reaches 750 r.p.m. It has been found that this arrangement eliminates the possibility of too rapidly accelerating the tub of the machine after the clothes have been accelerated to a sufficient speed to distribute themselves within the tub and has also reduced the hammer action of the drive mechanism which occurs when the tub is accelerated with only full torque output of the motor.

If an unbalance should occur within the tub causing excessive out of balance movement of the tub 24, the switch 180 will be opened to cause the motor to be connected for a lower torque output. Thus when switch contactor 184 is shifted out of engagement with its fixed contact, the motor must be fed through the resistor 187 regardless of the position of centrifugal switch contactor 102. When the unbalance is corrected, the contactor 184 re-engages its fixed contact to connect the motor for its higher output value of torque. This unbalance of course may occur before or after the movable contactor 118 is shifted into engagement with fixed contact 120 but in any event, the torque output of the motor is reduced whenever the unbalance switch 180 is moved to an open position by excessive unbalanced movement of the tub 24.

In the foregoing circuit, it is to be pointed out that the transmission solenoid 78 can never be energized when the motor is at rest because the centrifugal switch contactor 88 is out of contact with fixed contacts 94 and 96. This means that the motor will always be accelerated at least through the portion of its cycle wherein the tub is driven at a low tumbling speed of about 37.3 r.p.m. before the transmission can be shifted, which increases the torque load applied to the motor. Thus it is clear that if the power should fail across lines 132 and 134 and even though the timer operated switch contacts 110 are closed to call for energization of the relay 78, such energization cannot take place until the centrifugal switch contactor 88 has been moved into engagement with contacts 94 and 96, which as noted hereinbefore occurs at approximately 1500 r.p.m. motor speed.

When it is desired to effect a high-speed spin cycle for the tub 32 immediately following the low or intermediate spin cycle, the timer operated switch 110 remains closed while the timer operated switch 112 is caused to be closed. This switching of the timer operated switch 112 occurs rapidly and immediately following the intermediate spin cycle. With timer-operated switch contactor 112 in a closed position, it is seen that the centrifugal switch 100 is shorted out of the circuit so that resistor portion 187 is never inserted in the circuit during the high-speed spin cycle. The centrifugal switch 100 thus has no effect during the low-speed tumbling operation of the drum 32 and during the high-speed spin cycle, since in both of these cycles the timer operated switch 112 is closed.

With both timer operated switches 110 and 112 closed, and since a holding circuit is completed for spin shift solenoid 78 through movable contactor 82 and fixed contact 80, the transmission remains in its high-speed setting immediately following the intermediate spin cycle and during the beginning of the high-speed spin cycle. The motor is now accelerated on its reduced torque characteristic since the phase or start winding is energized from tap point 74 on the main winding 70. The motor will then accelerate to its running speed with the phase or start winding 72 being disconnected when centrifugal switch 84 operates. The top spin speed will be 431 r.p.m. since the transmission ratio between the motor and tub is 4.0 to 1 and the running speed of the motor is 1725 r.p.m.

It will be appreciated that the method of acceleration in the high-spin speed cycle differs from the method of acceleration in the intermediate spin speed cycle in that the centrifugal switch 100 never comes into play during the high-speed spin cycle. The method of acceleration during the high-speed spin cycle differs in another respect in that in the intermediate or low speed spin cycle the centrifugal switch never shifts so that contactor 86 never leaves fixed contacts 90 and 92. This is due to the fact that the centrifugal switch 100 controls the torque output of the motor in such a manner that the motor torque output is not high enough to cause the opening of the centrifugal switch. Thus during the intermediate or low speed spin cycle the phase winding is always in the circuit through the entire cycle, while in the high-speed spin cycle the phase or start winding 72 is eventually disconnected from the power circuit.

If an unbalance should occur so as to cause excessive out of balance movement of tub 24 during the high-speed spin cycle, the contactor 184 is shifted out of engagement with fixed contact 182, which will cause the resistor 187 to be connected in the motor circuit. This will temporarily reduce the torque output of the motor due to the voltage drop across the resistor 187, and until this unbalance is cured the motor will operate at a lower torque output. After the unbalance has been cured, the contactor 184 moves back into engagement with fixed contact 182 to short the resistor 187 out of the circuit and increase the torque output of the motor.

Figure 3:
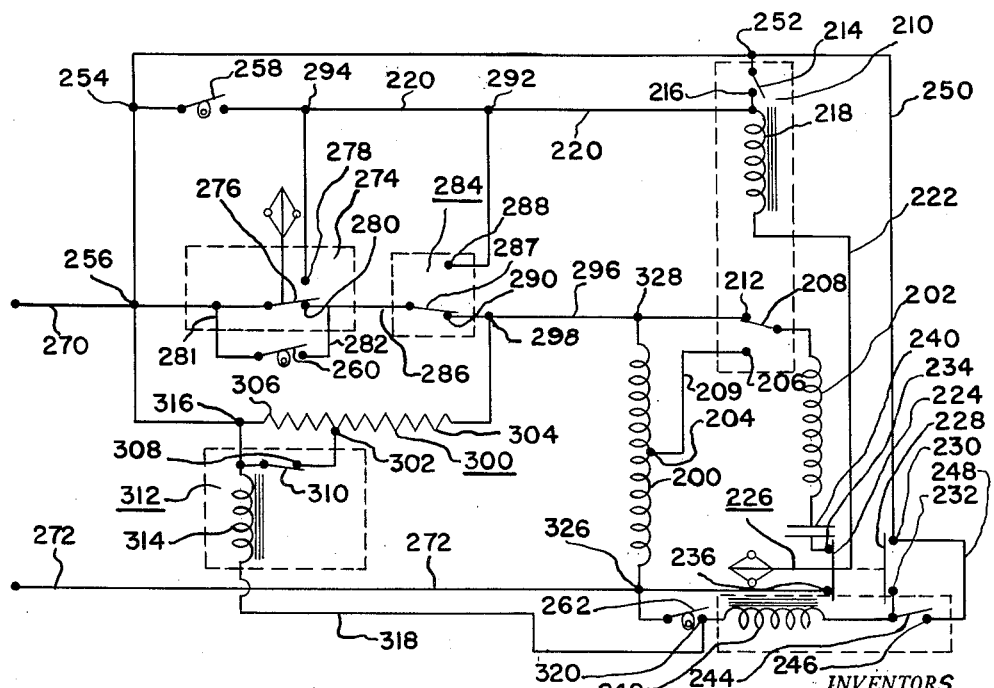
FIGURE 3 is a schematic illustration of a control circuit for controlling the motor and transmission illustrated in FIGURE 1.

Referring now more particularly to FIGURE 3, a modified control circuit for controlling the motor and spin shift solenoid of FIGURE 1 is illustrated. In this figure the motor once more has a four-pole main winding designated by reference numeral 200 and a four-pole phase or start winding designated by reference numeral 202. The main winding 200 of the motor is once more tapped as at 204 and this tap point is connected with a contact designated by reference numeral 206 via a lead 209. The phase winding 202 of the motor is connected with a movable contactor 208 of a relay designated by reference numeral 210. The relay 210 includes fixed contacts 206 and 212 and also includes a movable contactor 214 that cooperates with a fixed contact 216. The movable contactors 214 and 208 are operated by a relay coil designated by reference numeral 218. When relay coil 218 is energized, the contactor 214 is shifted into engagement with fixed contact 216 to provide a holding circuit for the relay. In addition, when relay coil 218 is energized, the contactor 208 is shifted into engagement with fixed contact 206. When relay coil 218 is deenergized, the contactor 208 engages fixed contact 212 and the contactor 214 is out of engagement with fixed contact 216.

One side of relay coil 218 is connected with a lead wire 220 whereas the opposite side of relay coil 218 is connected with a lead wire 222. The lead wire 222 is connected with a movable contactor 224 of a centrifugal switch generally designated by reference numeral 226. The centrifugal switch 226 is driven from the motor and includes the movable contactor 224, the movable contactor 228 and fixed contacts 230, 232, 234 and 236. It is seen that contactor 224 cooperates with fixed contacts 234 and 236 and that contactor 228 cooperates with fixed contacts 230 and 232. The contactor 228 is mechanically connected with contactor 224 but is not electrically connected with either the contactor 224 or the lead 222. The centrifugal switch 226 is designed so that contactor 224 leaves contacts 234 and 236 and contactor 228 engages contacts 230 and 232 at a motor speed of approximately 1500 r.p.m. The contactor 224 moves back into engagement with fixed contacts 234 and 236 at a motor speed of approximately 1200 r.p.m. and at this time the contactor 228 is shifted out of engagement with contacts 230 and 232. The phase or start winding 202 is connected between relay operated contactor 208 and the fixed contact 234 through a starting capacitor designated by reference numeral 240.

The spin shift solenoid for shifting the transmission 48 from its low speed output to its high speed output is designated by reference numeral 242 in FIGURE 3. This relay coil or solenoid coil, in addition to shifting the transmission, operates a contactor 244 that engages fixed contact 246 when the spin shift solenoid 242 is energized. The contactor 244 provides a holding circuit for the spin shift solenoid 242 via lead wire 248 which is connected between contact 246 and contact 230. The contact 230 is connected with a lead wire 250 which forms a common connection for junctions 252, 254 and 256.

The timer operated switches in the embodiment of FIGURE 3 are designated by reference numerals 258, 260 and 262. It will be appreciated that these timer operated switches are controlled by a plurality of cams that are driven by an electric motor and that the switches open and close in a predetermined sequence and through predetermined time intervals to control the operation of the motor and spin shift solenoid illustrated in FIGURE 1.

The input power lines in FIGURE 3 are designated by reference numerals 270 and 272, it being understood that these lines are connected with a suitable source of A.C. voltage through line switches or in some instances through other timer operated switches (not shown). The line 270 is connected with junction 256 and is connected with a centrifugal switch generally designated by reference numeral 274. The centrifugal switch 274 includes a movable contactor 276 and a pair of fixed contacts 278 and 280. The contactor 276 remains in engagement with fixed contact 280 until the motor speed reaches 750 r.p.m. whereupon the contactor 276 is shifted into engagement with fixed contact 278. Thus, at all speeds below 750 r.p.m. of the motor the contactor 276 engages fixed contact 280 and at all speeds above 750 r.p.m., the contactor 276 engages fixed contact 278. It is seen that the timer operated switch 260 is connected across a pair of contacts of the centrifugal switch 274 via leads 281 and 282.

The lead 282 is connected to one side of an unbalance switch designated by reference numeral 284 via a line 286. This unbalance switch 284 has a movable contactor 287 that alternately engages contacts 288 and 290. It will be appreciated that the switch 284 corresponds to the switch designated by reference numeral 62 in FIGURE 1 and when the tub does not move with excessive out of balance movement, the contactor 287 remains in engagement with fixed contact 290. If the tub 24 should move with an excessive out of balance movement, the contact 287 is temporarily shifted into engagement with fixed contact 288 until the unbalance is cured whereupon the contactor 287 moves back into engagement with fixed contact 290. It is seen that contact 288 is connected with junction 292 that is, in turn, connected with lead 220. The lead 220 is also connected with junction 294 and with one side of timer operated switch 258, the opposite side of the timer operated switch being connected with junction 254. The junction 294 is connected with contact 278 of centrifugal switch 274 as is clearly apparent from the drawings. The contact 290 of unbalance switch 284 is connected with relay contact 212 via a lead wire 296. It is seen that lead wire 296 is connected to one side of the main winding of the motor 200.

A ballast resistor generally designated by reference numeral 300 is provided having its ends connected with junctions 256 and 298. It is seen that the ballast resistor has a tap point 302 dividing the resistor into portions 304 to the right of the tap point and 306 to the left of the tap point. The tap point 302 is connected with a fixed contact 308 that cooperates with a movable contactor 310. The contact 308 and contactor 310 are parts of a relay generally designated by reference numeral 312 and including an actuating coil 314. One side of the relay actuating coil 314 is connected with junction 316 whereas the opposite side of the relay coil 314 is connected with a lead wire 318. It is seen that lead wire 318 is connected with junction 320 which is, in turn, connected to one side of timer operated switch 262 and to one side of spin shift solenoid 242. The lead wire 272 that forms one of the power input lines is connected with junction 326 and this junction is, in turn, connected with centrifugal switch contact 236. The junction 326 is connected to one side of the main winding 200 of the motor, as is clearly apparent from FIGURE 3. The opposite side of the main winding 200 of the motor is connected with line 296 at 328.

When it is desired to effect a low tumble speed operation for the tub 32 of the machine illustrated in FIGURE 1, the timer operated switch 262 is caused to be opened while timer operated switches 258 and 260 are caused to be closed. The closure of timer operated switch 258 completes an energizing circuit for relay coil 218 through the centrifugal switch contactor 224 to cause the contactor 208 to shift into engagement with fixed contact 206. The closure of timer operated switch 260 by-passes the centrifugal switch contactor 276 and the motor will be accelerated at a torque output that is less than full torque output since the phase or start winding 202 will be energized from tap point 204 on main winding 200. Since timer operated switch contact 262 is opened the spin shift solenoid 242 will not be energized. During acceleration, the phase or start winding 202 will be disconnected from the circuit and contactor 228 will connect the contacts 230 and 232. The motor will then be accelerated to 1500 r.p.m. at a lower than full torque output by the motor and the tumbling drum, and once the motor has attained full speed, will be driven at approximately 43 r.p.m. with a speed ratio of 40 to 1 between the motor and tub 32.

When it is desired to effect an intermediate or low-speed spin cycle for the tub 32 that immediately follows the low-speed tumble of the tub 32, the timer operated switch 262 is caused to be closed while timer operated switches are caused to be opened. It will be appreciated that this switching of the timer operated switch contacts to effect low or intermediate speed operation of the tub occurs very rapidly so that the motor does not slow down sufficiently to cause contactor 228 to shift away from contacts 230 and 232. The relay coil 218 is now deenergized since there is no circuit for the coil through centrifugal switch contactor 224, and thus the relay contactor 208 engages fixed contact 212. The transmission will be shifted to its higher speed output due to the fact that timer operated switch 262 is closed and due to the fact that the solenoid 242 is energized through centrifugal switch contactor 228. The motor at the beginning of the low speed spin cycle operates at full torque output since the phase or start winding is connected directly across the line via movable contactor 208.

The motor will now be accelerated at its full torque output with the transmission shifted since the shifting of the transmission causes the motor to slow down to a speed wherein contacts 234 and 236 are connected by contactor 224. When the transmission is shifted, the motor slows down to a speed below 750 r.p.m. so that auxiliary centrifugal switch contactor 276 is in engagement with fixed contact 280. The motor accelerates with its high torque output until the motor speed reaches 750 r.p.m. which corresponds to 188 r.p.m. tub speed with the transmission shifted and at this point the centrifugal switch contactor 276 is caused to become disengaged from contact 280 and engaged with contact 278. When contactor 276 engages contact 278 a circuit is now completed for relay coil 218 via the lead 220. With relay coil 218 energized, the contact 208 is shifted into engagement with contact 206 to reduce the torque output of the motor. The torque output of the motor is further reduced when contactor 276 moves into engagement with contact 278 due to the fact that the resistor 304 is now connected between the motor windings and the power input lines 270 and 272. The motor will then operate through the remainder of the intermediate spin cycle with the contactor 208 in engagement with fixed contact 206 and with the centrifugal switch contactor 276 alternately engaging contacts 278 and 280 depending upon the speed of the motor. When the motor speed exceeds 750 r.p.m., the contactor 276 is shifted to insert resistor 300 in the circuit and when the motor speed drops below 750 r.p.m. the contactor 276 engages fixed contact 280 to short the resistor 300 out of the circuit.

It should be noted that the relay coil 314 also modulates the amount of voltage applied to the motor in that it alternately short circuits the portion 306 of the resistor 300 and connects this portion of the resistor into the motor supply circuit when contactor 276 disengages from contact 280 or when contactor 287 disengages from contact 290. Thus, when the voltage across the relay coil 314 is above some predetermined value the contactor 310 moves out of engagement with contact 308 and the portion 306 of the resistor is inserted in the circuit. When the voltage across lines 270 and 272 is below some predetermined value, the relay coil 314 is not energized sufficiently to cause contactor 310 to move away from contact 308 and the portion 306 of the resistor 300 is shorted out of the motor circuit. It will be appreciated that the centrifugal switch 274 in combination with excursion switch 284 controls the connection of resistor 300 with the motor control circuit, but at certain times only the portion 304 of the resistor will be connected in the motor control circuit when the contactor 310 is in engagement with fixed contact 308. It is also to be appreciated that relay coil 314 can be energized only when a circuit is completed for the spin shift solenoid 242 and thus input voltage regulation occurs only during the time that the transmission is shifted to its high ouput speed, which is during the intermediate spin cycle and during the high-speed spin cycle.

From the foregoing, it will be clearly apparent that during the intermediate spin cycle the motor is first accelerated at its full speed torque output until the auxiliary centrifugal switch 276 operates to contact fixed contact 278. When this occurs, the torque output of the motor is reduced both by the insertion of resistor 300 in the circuit and also by the shifting of contactor 208 into engagement with fixed contact 206. During the intermediate spin cycle the centrifugal switch 226 is never operated at enough speed to cause the contactor 224 to leave the contacts 234 and 236 and, therefore, the phase or start winding 202 remains in the circuit during the entire intermediate spin cycle. During this intermediate spin cycle after initial acceleration under full line voltage, the contactor 208 remains engaged with contact 206 to reduce the torque output of the motor, but the resistor 300 is alternately connected into this circuit and shorted out of the circuit by centrifugal switch contactor 276.

If an unbalance should occur within tub 24 to cause an excessive out of balance movement of the tub before the motor reaches 750 r.p.m. during the intermediate spin cycle, the contactor 287 is shifted into engagement with fixed contact 88. This will cause the relay 218 to be energized to shift the contactor 208 into engagement with fixed contact 206 to effect a reduction of torque for the duration of spin operation due to reconnection of the phase circuit to the tap 204, and temporarily further reduces the torque until the unbalance is corrected by resistor 300 into the motor supply circuit. It is apparent that during any spin operations relay coil 218 will be initially energized by the first operation of either centrifugal switch 274 or excursion switch 284 and that thereafter relay coil 218 remains energized by virtue of the engagement of contactor 214 with contact 216 and furthermore that subsequent operation of said switches results in a temporary torque reduction produced from the insertion of the resistor 300 into the motor circuit. It is further to be noted that during high speed spin operation, with timer operated switch 260 closed, operation of centrifugal switch 274 no longer results in insertion of resistor 300 into the motor circuit but it could actuate relay 218 as described above.

For an ultimate or high speed spin cycle wherein the tub is driven at 431 r.p.m., the timer operated switch 262 remains closed and timer operated switch 260 is caused to be closed whereas the timer operated switch 258 remains open. The spin shift solenoid 242 remains energized since a holding circuit was previously completed for this solenoid via contactor 244 during the intermediate or low spin speed cycle. The motor will now accelerate with reduced torque output as described above. The motor will accelerate to its running speed of 1725 r.p.m. to disconnect contcts 234 and 236 at 1500 r.p.m.

If an excessive unbalance should occur within the tub 24, contactor 287 of switch 284 is shifted out of engagement with contact 290. During the time that the contactor 287 is out of engagement with contact 290 due to an excessive out of balance movement of the tub 24, the resistor 300 or the portion 304 thereof will be connected in series with the motor to decrease the torque output of the motor. When the unbalance is cured, however, the contactor 287 moves back into engagement with contact 290 to short out the resistor 300 and acceleration will then continue. If an unbalance causing contactor 287 to disengage from contact 290 occurs after the centrifugal switch 226 has caused contactor 224 to shift out of engagement with contacts 234 and 236, the resistor 304 or 300 is again connected back into the motor circuit, but at this time only the main winding is affected.

While the embodiments of the invention as herein disclosed constitute preferred forms, it is to be understood that other forms might be adopted.

What is claimed is as follows:

1. In combination, a machine having a part adapted to be driven at a low speed and at a higher speed, an electric motor having a predetermined output speed, a source of electrical power, a variable output speed transmission means connected between said electric motor and said part having a low output speed and a higher output speed, means for causing said part to be driven at said low speed including means for connecting said motor to said power source to cause said motor to accelerate to its predetermined output speed, means maintaining said transmission means in its low output speed setting when the motor is operating at its predetermined output speed, and means for causing said part to be driven at said higher speed, said last named means including means for causing said transmission means to be shifted to its higher speed output, and means for connecting the motor to the power source for reducing the torque output of said motor to a value less than full torque output but greater than zero torque output while said transmission means is shifted for its higher speed output.

2. In combination, a machine having a rotatable container adapted to be driven at a low tumbling speed and at a higher speed, an electric motor having a predetermined output speed, a power source, first control means connected with said power source and motor for increasing and decreasing the torque output of said motor in response to increase and decrease of motor speed, variable output speed transmission means connected between said electric motor and said container having a low output speed and a higher output speed, second control means for controlling said transmission means, means for causing said container to be driven at said low tumbling speed including means connected with said second control means for causing said transmission means to be shifted to its low output speed setting while said motor is operated at its predetermined output speed, and means for causing said container to be driven at said higher output speed, said last named means including means connected with said second control means for causing said transmission to be set to its higher output speed and further including said first control means for increasing and decreasing the torque output of said motor between values greater than zero torque output in response to increase and decrease of motor speed.

3. In combination, a machine having a part adapted to be driven at a low speed and at a higher speed, an electric motor having a predetermined output speed, variable output speed transmission means connected between said electric motor and said part having a low output speed and a higher output speed, a power source, means connecting said motor with said power source to operate it at its predetermined output speed, means setting said transmission at its low output speed setting when said motor is operating at its predetermined output speed to provide said low speed for said part, means for shifting said transmission to its higher output speed, and means for varying the torque output of said motor between two values which are greater than zero torque output in accordance with motor speed to maintain a speed of rotation of said motor less than its predetermined output speed when said transmission means is set for its higher output speed, whereby said part is moved at said higher speed.

4. In combination, a washing machine having a rotatable tub that is adapted to be driven at a low speed, an intermediate speed, and a high speed, an electric motor having a predetermined full speed output, variable output speed transmission means mechanically connected between said electric motor and said tub having a low speed output and a higher speed output, electrically energizable means for controlling the output speed of said transmission means, a power supply circuit, master control means operable through a predetermined sequence connected with said power supply circuit and with said motor and said electrically energizable means for controlling the operation of said motor and said transmission means, said control means being operative to connect said electric motor with said power supply circuit and operative to control said electrically energizable means to provide said low speed output for said transmission means whereby said low speed output for said tub is attained, an impedance, means including centrifugal switch means adapted to connect said impedance in circuit between said power supply circuit and said motor when said motor is operating above a predetermined speed and short circuiting said impedance to connect said power supply circuit and said motor when said motor speed is operating below said predetermined speed, said centrifugal switch means causing a variation in the voltage applied to said motor to provide said intermediate speed for said tub when said control means controls said electrically energizable means to shift said transmission means to its higher output speed, said control means connecting said motor with said power supply circuit to provide its full speed output when said control means controls said electrically energizable means to provide the higher speed output for said transmission means whereby said tub operates at said high speed, switch means actuated by a predetermined unbalanced movement of said tub, circuit means connected with said last-named switch means for reducing the voltage applied to said motor when said last-named switch means is actuated, and means for disabling said centrifugal switch means when said tub is being accelerated toward its high output speed.

5. In combination, a washing machine having a rotatable container that is adapted to be driven at a low tumbling speed, an intermediate spin speed, and a high spin speed, an electric motor having a predetermined full speed output, variable output speed transmission means mechanically connected betwen said electric motor and said container having a low speed output and a higher speed output, electrically energizable means for controlling the output speed of said transmission means, control means including switching means operable through a predetermined sequence, a power supply circuit, said control means being connected with said power supply circuit, said motor and said electrically energizable means to control the operation of said machine through a predetermined sequence, means for causing said tub to be driven at said low tumbling speed including said control means for connecting said motor to said power supply circuit and for controlling said electrically energizable means to provide the low output speed for said transmission means, means for causing said tub to be driven at said intermediate spin speed including centrifugal switch means driven by said motor for causing a variation in the voltage applied to said motor between two values greater than zero in response to the increase and decrease of motor speed about a predetermined value while said electrically energizable means is controlled by said control means to provide the higher output speed for said transmission means, said container being driven at said high spin speed when said control means connects said motor to said power supply circuit to provide its full output speed and controls said electrically energizable means to provide the higher output speed for said transmission means.

6. In combination, a washing machine having a rotatable tub that is adapted to be driven at a low tumbling speed, an intermediate spin speed and a high spin speed, an electric motor having a predetermined full speed output, variable output speed transmission means mechanically connected between said electric motor and said tub having a low speed output and a higher speed output, electrically energizable means for controlling the output speed of said transmission means, a power supply circuit, control means including switching means connected with said power supply circuit and with said electrically energizable means and operable through a predetermined sequence to control the operation of said machine, said control means connecting said electric motor with said power supply circuit and controlling said electrically energizable means to provide the low output speed for said transmission means whereby said tub is driven at said low tumbling speed, means for causing said tub to be driven at said intermediate spin speed including means connected with said control means and with said motor for varying the voltage applied to said motor between two values greater than zero in response to the increase and decrease of motor speed about a predetermined value when said control means causes said transmission means to have its higher output speed, and means for causing said tub to be driven at said high spin speed including said control means for connecting said motor with said power supply circuit while said control means controls said electrically energizable means to provide the higher output speed for said transmission means, and voltage regulating means connected between said power supply circuit and said motor.

7. In combination, a washing machine having a rotatable tub that is adapted to be driven at a low tumbling speed, an intermediate spin speed and a high spin speed, an electric motor having a predetermined full speed output, variable output speed transmission means mechanically connected between said electric motor and said tub having a low speed output and a higher speed output, electrically energizable means for controlling the output speed setting of said transmission means, a power supply circuit, control means including switching means operable through a predetermined sequence connected with said power supply circuit and with said motor and electrically energizable means for controlling the motor and said transmission means in a predetermined sequence of operation, said tub being driven at said low tumbling speed when said control means connects said motor to said power supply circuit to provide its full output speed and while said control means controls said electrically energizable means to provide the low output speed for said transmission means, an impedance, centrifugal switch means driven by said motor, means including said centrifugal switch means adapted to connect said impedance in circuit between said power supply circuit and said motor when said motor is operating above a predetermined speed and short circuiting said impedance to directly connect said power supply circuit and said motor when said motor speed is below said predetermined speed, said centrifugal switch means varying the torque output of said motor and providing an intermediate spin speed for said tub under the control of said control means when said control means controls the electrically energizable means to provide the higher output speed for said transmission means, and means for providing said high spin speed for said tub including said control means for connecting said motor to said power supply circuit while said electrically energizable means is controlled by said control means to provide the higher output speed setting for said transmission means, switch means actuated in response to a predetermined unbalanced movement of said tub, means including said switch means for causing a reduction in the voltage applied to said motor when said last-named switch means is actuated, means for disabling said centrifugal switch means when said tub is accelerated toward said high speed spin, and voltage regulating means connected with said power supply circuit and said motor.

8. In combination, a machine having a rotatable part that is adapted to be driven at a low speed and at a higher speed, an electric motor having a predetermined output speed, a power supply circuit, variable output speed transmission means mechanically connected between said motor and said part having a low speed output and a higher speed output, electrically energizable means for controlling the output speed of said transmission means, control means operable through a predetermined sequence for connecting said motor and said electrically energizable means with said power supply circuit, said control means being operative to cause said motor to be connected with said power supply circuit to provide its predetermined output speed while said electrically energizable means is controlled by said control means to provide its low output speed, said control means being operative to control said transmission means to shift it to its higher output speed setting, and means connected between said power supply circuit and said motor for varying the voltage applied to said motor between two values which are greater than zero in accordance with motor speed during the time that said control means controls said electrically energizable means to provide the high output speed for said transmission means whereby the higher speed for the rotatable part is attained.

9. In combination, a washing machine having a rotatable tub that is adapted to be driven at a low speed, an intermediate speed that is higher than said low speed and a high speed that is higher than either said low speed or said intermediate speed, an electric motor having a predetermined running speed, variable output speed transmission means mechanically connected between said electric motor and said tub having a low output speed and a higher output speed, electrically energizable means for controlling the output speed of said transmission means, power supply terminals, control means including switching means connected with said power supply terminals and with said motor and electrically energizable means for controlling the operation of the motor and electrically energizable means in a predetermined sequence, said control means connecting said electric motor with said power supply terminals and controlling said electrically energizable means to provide the low output speed for said transmission means whereby said tub is driven at said low speed, and means for varying the voltage applied to said motor between two values which are greater than zero in accordance with the output speed of said motor to maintain the speed of the motor at a value that is less than said running speed when said control means controls said electrically energizable means to provide the higher output speed setting for said transmission means whereby said tub attains said intermediate speed, said control means connecting said motor to said power supply terminals to provide its running speed while causing said electrically energizable means to be shifted to its high output speed setting whereby said tub attains said high speed.

10. In combination, a washing machine having a rotatable tub that is adapted to be driven at a low speed, an intermediate speed that is higher than said low speed and a high speed that is higher than either said low speed or said intermediate speed, an electric motor having a predetermined full speed output, variable output speed transmission means mechanically connected between said electric motor and said tub having a low speed output and a higher speed output, electrically energizable means for controlling the output speed of said transmission means, a power supply circuit, control means including switching means operated in a predetermined sequence connected with said power supply circuit and with said electrically energizable means and with said motor for controlling the operation of said machine in a predetermined sequence, said control means connecting said motor to said power supply circuit and controlling said electrically energizable means to provide a low speed output from said transmission means whereby said tub is driven at said low speed, said control means being operable in another position to cause said electrically energizable means to be controlled to provide a high speed output for said transmission means, means operating in response to motor speed and connected with said power supply circuit for increasing and decreasing the voltage applied to said motor between two values which are greater than zero to maintain the motor speed at a value that is less than its full speed output when said control means has controlled said electrically energizable means to provide the high output speed for said transmission means, said intermediate speed being thereby attained when said transmission means is shifted to its high output speed setting and when the voltage applied to the motor is being varied to provide a motor speed less than its full running speed, and means for causing said tub to be driven at its high speed including said control means for connecting said motor to said power supply circuit to provide its full output speed while said electrically energizable means is controlled by said control means to provide the high output speed for said transmission means.

11. In combination, a washing machine having a rotatable tub that is adapted to be driven at a low speed and at a higher speed, an electric motor having a predetermined running speed, variable output speed transmission means mechanically connected between said electric motor and said tub having a low speed output and a higher speed output, a power supply circuit, control means including switching means connected with said power supply circuit and with said motor and electrically energizable means for controlling the operation of said motor and transmission means in a predetermined sequence, said control means connecting said electric motor with said power supply circuit whereby said motor is accelerated to its running speed while said control means causes said electrically energizable means to provide a low speed output for said transmission means, an impedance, said control means connecting said electric motor with said power supply circuit through said impedance when said electrically energizable means is controlled by said control means to provide the higher speed output for said transmission means, and means for shorting out at least a portion of said impedance in response to said motor attaining a predetermined speed less than said running speed and during the time that said transmission means is set for its higher output speed setting.

References Cited in the file of this patent

UNITED STATES PATENTS

| 766,991 | Churchward | Aug. 9, 1904 |
|---|---|---|
| 2,161,604 | Watts | June 6, 1939 |
| 2,398,997 | Berry et al. | Apr. 23, 1946 |
| 2,657,587 | Volk et al. | Nov. 3, 1953 |
| 2,677,285 | Volk | May 4, 1954 |
| 2,981,089 | Neyhouse et al. | Apr. 25, 1961 |
| 3,003,090 | Neyhouse et al. | Oct. 3, 1961 |